E. T. VAN BOVEN.
CULTIVATOR.
APPLICATION FILED FEB. 13, 1911.
1,019,382.
Patented Mar. 5, 1912.
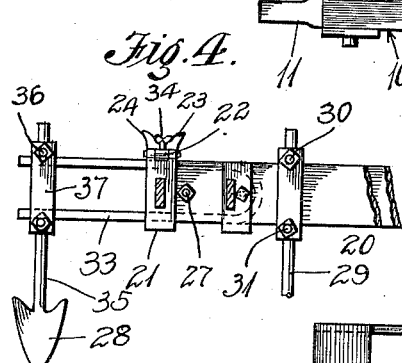
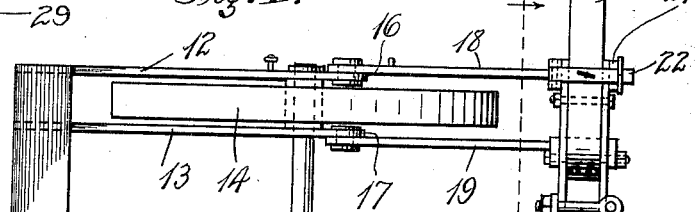
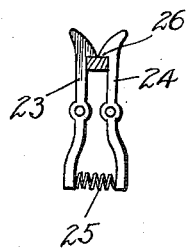
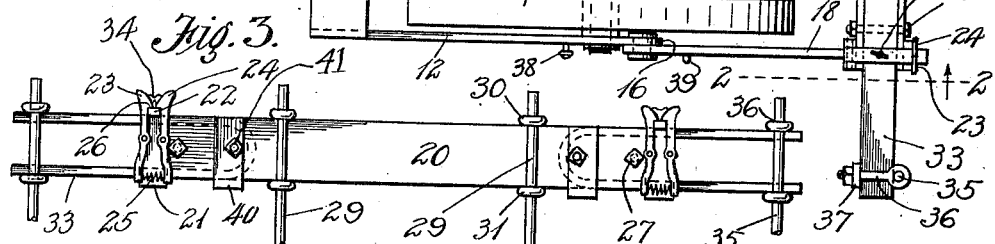
Witnesses.
E. R. Pollard
C. Severance
Inventor.
Edward T. Van Boven
Howard & Howard
Attys.

UNITED STATES PATENT OFFICE.

EDWARD T. VAN BOVEN, OF REDLANDS, CALIFORNIA.

CULTIVATOR.

1,019,382.      Specification of Letters Patent.      Patented Mar. 5, 1912.

Application filed February 13, 1911. Serial No. 608,278.

*To all whom it may concern:*

Be it known that I, EDWARD T. VAN BOVEN, a citizen of the United States, residing at Redlands, in the county of San Bernardino and State of California, have invented new and useful Improvements in Cultivators, of which the following is a specification.

This invention relates to improvements in cultivating devices, and it is an object of the invention to provide a cultivator which is well adapted to operate between growing articles and especially the trees of orchards as fruit, nut trees or the like.

It is also an object of the device to provide means which can be widened or shortened according to the space between the trees and can be folded to accommodate narrower spaces when necessary.

In the drawing forming a part of this specification, Figure 1 is a top plan view of the cultivator. Fig. 2 is a side elevation of the improved cultivator, a portion of the implement being shown in section, and the said section being taken on the line 2—2 of Fig. 1. Fig. 3 is a rear elevation of the implement carrying cross beam, some of the implement being broken away. Fig. 4 is a detail sectional view taken upon the line 4—4 of Fig. 1. Fig. 5 is a detail view of one of the spring clamps employed in connection with the adjustable end portion of the cultivator beam.

The parts of the invention will now be more particularly described reference being had to the drawing in which a cultivator frame as 10 is formed with a transverse portion or front beam to which the draft tongue 11 is secured. Extending rearwardly from this beam of the frame are horizontal bars 12 and 13, the bars 12 being upon the outsides of supporting wheels 14 while the bars 13 are upon the inner sides thereof as clearly shown in Fig. 1.

The wheels 14 are of any desired type and height and are carried by a transverse shaft 15 which is connected with the arms 12 and 13 at each side of the frame. The wheels rotate loosely upon the shaft between the said bars 12 and 13 on each side of the cultivator. The said bars 12 and 13 project a short distance beyond the shaft 15 and to the rear thereof as indicated at 16 and 17 and carry pivoted extension bars as 18 and 19. The said bars 18 and 19 upon each side of the frame extend to the rear of the wheels 14 a sufficient distance to have secured thereto the transverse implement carrying beam 20 of the cultivator.

The cultivator beam 20 is preferably made up of two parallel bars, the front one of which is rigidly secured to the rear ends of the pivoted bars 18 and 19 in any desired manner. The rear bar is held with respect to the front bar by means of yokes 21 which are secured to the front bar and project upwardly at their upper ends a slight distance above the component bars of the said beam 20 as clearly indicated in Fig. 2. The said bars 18 pass through the yokes 21 in reaching the beam 20. A cross latch bar as 22 is pivoted to one leg of each yoke 21 while its rear free end extends across the tops of the bars of said beam 20 and are adapted to be engaged by the pivoted members 23 and 24 of latch devices mounted upon the beam 20 opposite each of said yokes. The lower ends of the members 23 and 24 are normally spread apart by springs 25 and their upper ends are formed with latch shoulders 26 adapted to receive between them and lock in place, the pivoted bars 22. The front and rear bars of the beam 20 are also connected by bolts 27. The said bars are also connected by inner yokes or U shaped frames 40 which are held in place by bolts 41. The bolts 41 not only hold the yokes in place but serve to increase the rigidity of the frame 20.

The securing means for holding the cultivating implement also tend to hold the bars of the beam with respect to each other. Thus cultivator blades as 28 of any desired type may be applied to the beams 20 at one or more points, the standards or stocks 29 thereof extending upwardly past the beam and being engaged by eye bolts 30 and 31, which are held fast against the beam by means of plates or bars 37 secured to the eye-bolts upon the forward sides of the said beam 20.

The beam 20 is adapted to be lengthened by carrying end sections 33, 33. These extension frames 33 are preferably formed of U shaped bars folded upon each other and having the yoke or closed ends thereof turned inwardly as clearly shown in Figs. 3 and 4. The bars 33 are made of suitable width to fit between the ends of the component bars of the beam 20 and also fit within the yoke 21 and to be held in place by the latch bars 22 carried by the said yokes. The said extension beams 33 rest upon the yokes 21 and the yokes 40 and slide thereon when the said beams are adjusted back and forth. The ends of the bars 19 pass through the yokes 40 in reaching the beam 20.

When it is desired to turn either one of the extension beams 33 out of operative position, the latch bar 22 controlling the same is turned backwardly upon its pivot point having been first released from the latches 23 and 24 by pressing their lower ends together. The said beams can be turned upwardly and latched in place again at any desired time, in which event the ends of the latches 22 are forced between the ends 26 of said latch bars 23 and 24. The beams 33 are also provided with one or more cultivator implements having standards 35 secured thereto by eye-bolts 36 and bars 37 in the same manner as the other standards heretofore described and as connected with beam 20.

The beam 20 with the pivoted bars 18 and 19 form a pivoted frame which may be rocked upwardly over the wheels 14 when the cultivators are not in use and when the implement is being driven from place to place. Hooks as 38 may be employed, adapted to engage eyes 39 upon the sides of the frame for holding the pivoted portion of said frame in its elevated position as indicated in dotted lines in Fig. 2.

The adjustment of the beam extension 33 makes it possible to vary the width of the device and increase or diminish its effective area in cultivating the ground. The said extension beams also make it possible to cause the cultivator to reach beneath the overhanging portion of vegetation as for instance beneath fruit or other trees so as to make it possible to cultivate quite closely to the stems or stocks of said trees.

What I claim is:—

1. A cultivator comprising a supporting frame, wheels carrying the same, a transversely extending beam structure mounted on said frame, extension end beams carried by the said beam structure and adapted to be set at different points within the beam structure when loose for varying the amount of their projection or adapted to be folded back upon the beam, and beam inclosing means adapted to hold the said extensions in position when extended and clamp them between the portions of the said beam structure.

2. A cultivator comprising a wheeled frame, a pivoted frame section adapted to rock upwardly and forwardly thereon having a transverse cultivator beam formed thereon, end extension sections carried by said cultivator beam and adapted to be folded upwardly upon the beam for shortening the reach thereof, the said end extension sections also being capable of adjustment so as to project to different distances beyond the ends of the beam, and means for clamping the said end extension sections in their adjusted positions.

3. A cultivator mechanism, comprising a wheeled frame, a pivoted beam frame mounted thereon, the beam portion thereof being made up of vertically arranged parallel bars spaced apart, U shaped extension frames fitting in the spaces between the bars of said beam and adapted to be adjusted longitudinally or turned upwardly with respect thereto, and inclosing clamps fitting upon the bars of the beam and adapted to hold the said U shaped extension frames in their adjusted positions.

4. A cultivator mechanism comprising a wheeled frame, an implement beam, pivotally secured thereto and made up of spaced bars suitably connected, beams extensions mounted between said spaced bars, yokes adapted to hold said extensions upon the beam, and spring actuated latches for removably securing said beam extensions within the said yokes.

5. A cultivator comprising a suitable frame, an implement carrying extension beam pivotally mounted thereon having space bars adapted to receive extension beams, extension beams mounted in the space between said bars, yokes for holding the beam extensions in place, having latched bars adapted to extend across the beam extensions, pivoted latches for holding said bars in place, and set screws carried by the latch bars and adapted to impinge upon the beam extensions for holding them in adjusted position.

In witness that I claim the foregoing I have hereunto subscribed my name this 4th day of February, 1911.

EDWARD T. VAN BOVEN.

Witnesses:
  EDMUND A. STRAUSE,
  CASSELL SEVERANCE.

---

Copies of this patent may be obtained for five cents each, by addressing the "Commissioner of Patents, Washington, D. C."